June 23, 1959 H. I. SIDES 2,891,801
TELESCOPING GROCERY CARTS PROVIDED WITH
FOLDING SEAT ARRANGEMENTS
Filed Feb. 23, 1954 3 Sheets-Sheet 1

INVENTOR.
Harold I. Sides
BY
Herman Seid
Atty.

June 23, 1959　　　H. I. SIDES　　　2,891,801
TELESCOPING GROCERY CARTS PROVIDED WITH
FOLDING SEAT ARRANGEMENTS
Filed Feb. 23, 1954　　　　　　　　3 Sheets-Sheet 2

INVENTOR.
Harold I. Sides
BY
Herman Seid
atty.

June 23, 1959 H. I. SIDES 2,891,801
TELESCOPING GROCERY CARTS PROVIDED WITH
FOLDING SEAT ARRANGEMENTS
Filed Feb. 23, 1954 3 Sheets-Sheet 3

INVENTOR.
Harold I. Sides
BY
Herman Seid
Atty.

United States Patent Office 2,891,801
Patented June 23, 1959

2,891,801

TELESCOPING GROCERY CARTS PROVIDED WITH FOLDING SEAT ARRANGEMENTS

Harold I. Sides, Chicago, Ill., assignor of one-half to Raymond M. Sides

Application February 23, 1954, Serial No. 411,806

6 Claims. (Cl. 280—33.99)

This invention relates to nesting or telescoping grocery carts of the kind employed in super markets of the self serve type, and more particularly to nesting grocery carts provided with a folding seat arrangement.

In such nesting grocery carts, it is usual to have a rear end gate which pivots or swings from the top so that the end gate may be pushed upwardly when the following basket is nested within a forward basket.

The general object of this invention is to provide a folding baby seat arrangement which is combined with the end gate, so that when carts are nested together, the folding baby seat arrangement will in effect be swung upwardly in level position adjacent the gate and become part of a unitary assembly with the gate. Thus nesting carts with baby seat arrangements will readily telescope together when pushed one into the other in the conventional way.

A feature of the invention resides in the provision of a frame pivoted at the bottom rod of an end gate to permit the frame to swing toward and away from the end gate.

Another feature of the invention resides in the provision of a seat which is pivoted on a rod positioned from the bottom of the end gate and looped about the frame so that it may ride up and down upon the frame to assume an open position as well as a closed position.

A further feature of the invention resides in the arrangement of the seat in which the seat is pivoted on the end gate and so disposed with respect to the swinging frame that the seat will always incline downwardly from rear to front when in open position.

Other features of the invention will be apparent from the following detailed description.

The attached drawings illustrate a preferred embodiment of the invention, in which.

Figure 1:
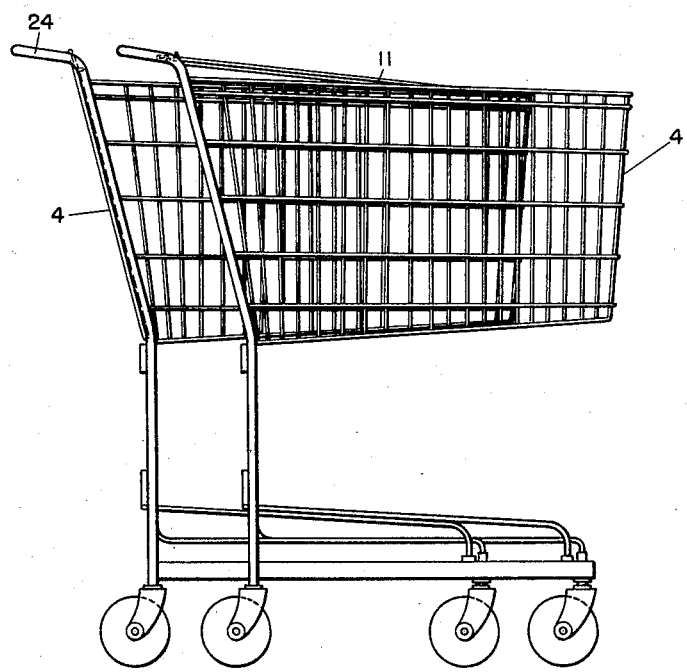
Figure 1 is a view in side elevation showing a plurality of telescoping carts nesting together with a folding baby seat arrangement in elevated, folded, flat condition adjacent their cooperating end gates.

Considering the drawings, similiar designations referring to similar parts, numeral 4 designates a telescoping cart having an upright frame 5 and end gate 6. The end gate has a frame member 7 of usual form except that the upright wires 8 do not extend above uppermost transverse rod 9.

Pivoted to bottom member 10 of the end gate 6 is a swingable frame 11 with a lower transverse rod 12 and an upper transverse rod 13. Between rods 12 and 13 are provided vertical struts or wires 14 to impart strength to the frame and also serve as a back for seat 15 which will now be described.

Seat 15 comprises a frame member 16 which is looped or hooked about transverse rod 9 of the end gate at swivel points 17. The frame member 16 has a back rod 18 which extends behind vertical struts 14 and rides up and down on them as swingable frame 11 moves toward or away from end gate 6.

Figure 2:
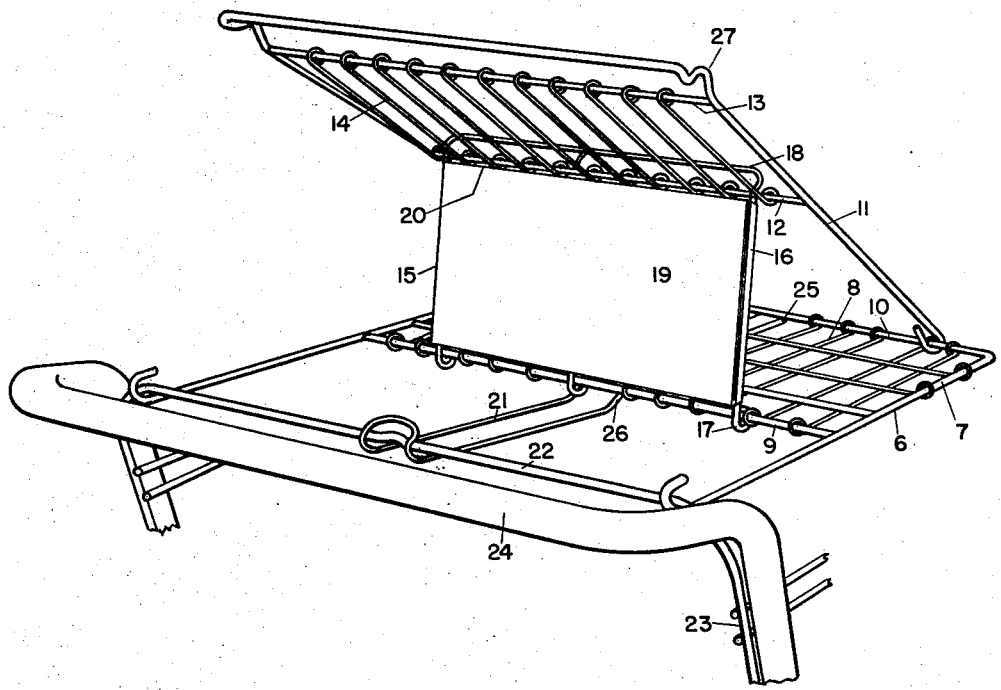
Figure 2 is an isometric view of the end gate and baby seat arrangement in an elevated unfolded condition.
Figure 4:
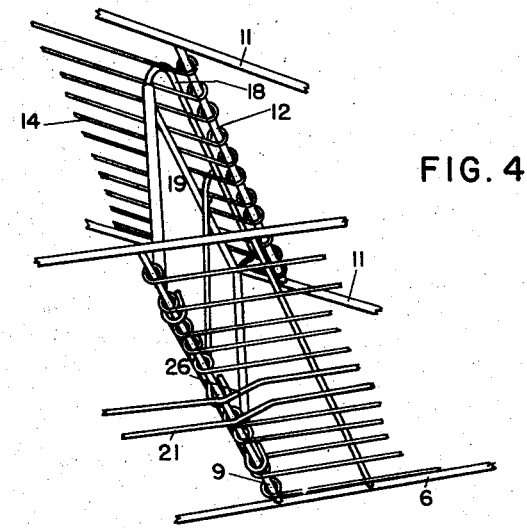
Figure 4 is an isometric view of the rear of the seat arrangement.
Figure 3:
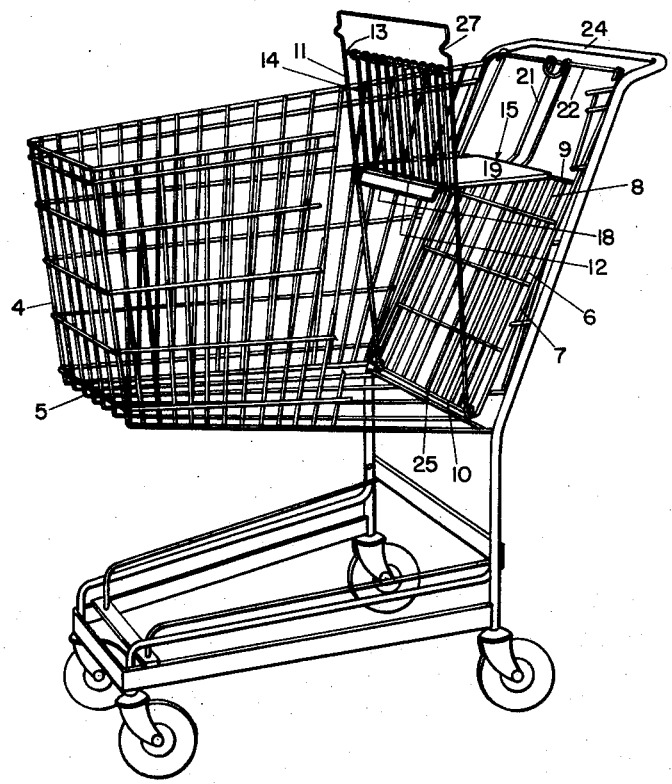
Figure 3 is an isometric view of the baby seat arrangement in assembled open condition.

A seat cover or support surface 19, preferably of metal, is folded about the sides of frame member 16, as shown in Figures 2 and 4. The rear edge 20 of supporting surface 19 is spaced from back rod 18 in order to permit the seat to ride up and down on the struts 14.

A center frame support 21 is looped about the pivoting rod 22 which in turn is held by the upright frame 23 of the cart itself, close to handle 24. The frame support extends the full length of the swinging gate and is welded at points 25 where both legs of the frame support meet bottom 10 of the end gate.

The center frame support is bent at points 26 to form a slight indentation spaced from the plane of the end gate so that the seat in folded position will be lodged within a receiving depression within center frame support 21. When frame 11 is swung away from the end gate, the seat will tilt slightly downwardly toward the end gate since back rod 18 of the seat, when resting on transverse rod 12 will be somewhat higher than the front of the seat which is resting on transverse rod 9 of the end gate. This is of great importance from a sanitary standpoint since such moisture as may collect upon the seat will tend to flow downwardly away from the cart rather than into the cart as would be the case if the seat tilted toward the basket of the cart.

In view of the open space in the end gate above transverse rod 9, a child seated on supporting surface 19 will have its back resting against struts 14 while its feet will dangle downwardly behind wire back rods 8 of the end gate.

Since there are no wires below transverse rod 12 of frame 11 full basket space will be available for storage of merchandise since there is no obstruction in the swingable frame below the seat. The full space below the seat is available for storage and carriage of goods.

The swingable frame 11 at its opposite sides is provided with depressions 27 so that when the frame is in flat condition adjacent the end gate, it will fit snugly thereagainst because the depressions 27 will snugly contact rod 22.

It will be appreciated that the baby seat automatically folds not only by hand but by the nesting of one cart into another. Since the back seat of the folding baby seat is sufficiently high to strike against the handle of the preceding cart when one cart is pushed into another cart the back of the folding baby seat of the second cart will strike against the handle of the first cart; as the second cart is pushed forward the baby seat automatically folds.

Applicant has provided a simple, foolproof, sanitary and inexpensive baby seat arrangement which may be readily combined with an end gate of usual construction. The frame and other members of the arrangement will preferably be of metal, chromium finished, and hence easily kept clean so that the appearance will be attractive and in keeping with the cart as a whole.

The baby seat carts nest as closely with each other as the usual carts not provided with such arrangements nest with each other; the baby seat carts may be nested with the usual carts without difficulty and nest as closely therewith as they nest with each other or as the usual carts nest with each other.

It is obvious that various changes may be made in this structure as well as inter-relation of the parts, and applicant reserves all rights with respect to modification in design of any parts as well as in their assembly. Therefore, the invention should not be deemed limited to the precise form illustrated, except as set forth in the claims.

I claim:

1. In combination with an end gate of a grocery cart, a seat arrangement adapted to fold thereon in closed position, said seat arrangement comprising a swingable frame member pivoted on the lower end of the gate, said frame member having transversely extending rod members and reenforcing elements extending between the rod members to form a wall portion spaced from the bottom of the frame forming the back of the seat, a seat frame member pivotally connected to the gate terminating in a portion extending transversely rearwardly of the reenforcing elements and adapted to ride on said elements as the swingable frame member is moved toward or from the gate, and a seat attached to the seat frame spaced from the rearwardly extending portion thereof.

2. In combination with a grocery cart including a basket having a swingable end gate pivotally mounted at its upper end to the cart, a folding seat arrangement secured to the end gate, said seat arrangement comprising a frame member, the lower end of the frame member being pivotally mounted on the lower end of the gate, said frame member including transversely extending rods spaced from each other and reenforcing elements extending therebetween forming a wall portion spaced from the lower end of the frame, and a seat member connected to the gate at a position spaced from the position at which the frame member is mounted on the lower end of the gate, said seat member including a rod member extending transversely rearwardly of the reenforcing elements and adapted to ride on said elements as the frame is moved toward or from the gate, one of said transversely extending rods serving as a support for the seat when it is placed in useable position.

3. The combination according to claim 2 in which the seat comprises a frame member terminating in hook-like portions swivelled about a transverse rod of the gate member, and a cover supported on the seat frame member, said cover being spaced from the rod member of the frame.

4. In a grocery cart, the combination of a frame member forming a basket, said frame including a support, a swingable end gate mounted on said support, a center frame member for the gate pivotable on said support, said center frame member having a portion bent within the plane of the gate to provide a depression spaced from the plane of the end gate, and a foldable seat arrangement mounted on said gate adapted when in folded position, to be lodged within the depression in the center frame member, said end gate including frame members suspended from said support, spaced transverse rods connecting said frame members, and reinforcing members connecting said rods, and the foldable seat arrangement comprising a swingable frame pivoted on the lower rod of the gate, said frame including spaced transversely extending rod members and reinforcing elements extending between the rod members to form the back of the seat, a seat frame member connected to a second transverse rod of the gate terminating in a portion extending transversely rearwardly of the reinforcing elements of the swingable frame and being adapted to ride on said elements as the swingable frame is moved toward or from the gate, and a cover attached to the seat frame members spaced from the rearwardly extending portion thereof.

5. The combination according to claim 4 in which the seat in extended useable position tilts toward the gate.

6. The combination according to claim 5 in which the swingable frame is formed with depressions to receive the support of the basket frame member when the seat arrangement is folded in closed position.

References Cited in the file of this patent

UNITED STATES PATENTS

| 1,784,390 | Rice | Dec. 9, 1930 |
| 2,427,121 | Bohmer | Sept. 9, 1947 |
| 2,662,775 | Goldman | Dec. 15, 1953 |
| 2,813,725 | Hoedinghaus et al. | Nov. 19, 1957 |

FOREIGN PATENTS

| 1,027,679 | France | Feb. 18, 1953 |